(12) United States Patent
Bruning

(10) Patent No.: US 7,471,062 B2
(45) Date of Patent: Dec. 30, 2008

(54) WIRELESS BATTERY CHARGING

(75) Inventor: Gert W. Bruning, Sleepy Hollow, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 788 days.

(21) Appl. No.: 10/170,034

(22) Filed: Jun. 12, 2002

(65) Prior Publication Data

US 2003/0231001 A1 Dec. 18, 2003

(51) Int. Cl.
*H01M 10/46* (2006.01)
(52) U.S. Cl. ..................... 320/108
(58) Field of Classification Search .......... 320/108, 320/112, 106, 110, 113, 114, 101, 145, 162, 320/103, 109, 137, 140; 307/18, 19, 20, 307/46, 150, 43, 66, 414; 323/906; 136/243, 136/244
See application file for complete search history.

(56) References Cited

U.S. PATENT DOCUMENTS

| | | | | |
|---|---|---|---|---|
| 4,341,607 A * | 7/1982 | Tison | ................. | 205/343 |
| 5,811,958 A * | 9/1998 | Yamamoto | ............. | 320/101 |
| 5,952,814 A * | 9/1999 | Van Lerberghe | ........ | 320/108 |
| 6,040,680 A * | 3/2000 | Toya et al. | ............ | 320/108 |
| 6,262,559 B1 * | 7/2001 | Eggert et al. | ........... | 320/103 |
| 6,369,461 B1 * | 4/2002 | Jungreis et al. | ........... | 307/46 |
| 6,384,570 B2 * | 5/2002 | Matsuyama | ............ | 320/101 |
| 6,429,621 B1 * | 8/2002 | Arai | ................... | 320/101 |
| 6,441,589 B1 * | 8/2002 | Frerking et al. | ......... | 320/162 |
| 6,462,507 B2 * | 10/2002 | Fisher, Jr. | ............. | 320/101 |
| 6,504,340 B1 * | 1/2003 | Lee | ................... | 320/101 |
| 6,522,955 B1 * | 2/2003 | Colborn | ............... | 700/286 |
| 6,555,990 B1 * | 4/2003 | Yang | ................. | 320/113 |
| 7,095,210 B2 * | 8/2006 | Tamura et al. | ......... | 320/103 |
| 2003/0128010 A1 * | 7/2003 | Hsu | ................... | 320/101 |

FOREIGN PATENT DOCUMENTS

JP 06-078473 * 3/1994

* cited by examiner

*Primary Examiner*—Edward Tso
(74) *Attorney, Agent, or Firm*—Michael E. Belk

(57) ABSTRACT

Batteries in portable electrical or electronic devices are charged, through by a wireless battery charger, having an intermediate electrical energy storage device that is charged from a non-power line connected source, and discharged to recharge the battery of a portable device placed into a charge port of the wireless battery charger. The non-power line connected source may be a solar cell for converting light impinging on the solar cell into electrical energy. The non-power line connected source may also be a fuel cell for converting a fuel into electrical energy. The wireless battery charger may also include multiple sources, such as both a solar and a fuel cell. Charging the intermediate electrical energy storage device from the non-power line connected source may take place over an extended period of time having a duration longer than the time required to charge the battery of the portable device. The wireless battery charger and portable device may include transformer elements that allow the battery of the portable device to be re-charged by magnetic induction, without the need for electrical contacts in either the charger port or on the portable device.

20 Claims, 3 Drawing Sheets

WIRELESS BATTERY CHARGING

TECHNICAL FIELD OF THE INVENTION

This invention relates to charging batteries in portable electrical and electronic devices, and more particularly to charging such batteries in circumstances where it is impossible or undesirable to charge the batteries in the portable device using a battery charger connected to a power line.

BACKGROUND OF THE INVENTION

There are many types of portable electrical and electronic devices in use today that include rechargeable batteries, so that device can be used without a cord connecting it to a wall socket connected to a power line or grid. Examples of such cordless electrical devices include power hand tools, bathroom appliances such as electric toothbrushes and shavers, and kitchen appliances such as mixers or electric knives. Examples of portable electronic devices include cellular telephones, pagers, two-way radios, telemetry equipment, personal data assistants (PDA), computers, hand held video games, and audio entertainment devices such as portable radios, compact disc (CD) players, and tape recorders. Normally the batteries in these electrical and electronic devices are re-charged by connecting the device through a cord directly to a power line, or by placing the device in a charger connected by a cord to a power line receiving electrical power from a municipal utility grid or a generator.

There are circumstances, however, under which it is impossible or undesirable to connect to a utility grid through a power cord, or where it is preferable to use another source of power for re-charging the battery. One such circumstance is encountered in operating devices with re-chargeable batteries in a remote outdoor location, perhaps outdoors while backpacking, canoeing, camping, or skiing, where there is no access to utility power lines or portable generators. Carrying extra disposable batteries in such circumstances is not desirable due to extra bulk and weight that must be carried both in and out of the wilderness, so that the spent batteries can be responsibly disposed of in an environmentally friendly manner.

It is also sometimes preferable for safety reasons to avoid the need for connecting a charger to a wall socket, in a kitchen or a bathroom for example, to preclude the risk of inadvertent electrical shock.

In other instances, while it may be possible to run an electrical cord to a charger, it is inconvenient to do so. For example, it is common practice in busy restaurants to give paging devices that vibrate and light up to patrons waiting for tables. These pagers must be kept charged, and it may not be convenient to have an electrical outlet adjacent the maitre d' station, or to run an electrical cord to a remote outlet, for charging the pagers.

What is needed, therefore, is an improved apparatus and method for recharging batteries in portable electrical and electronic devices, in a manner that does not require the device or a charger to be connected to a power line or a generator.

SUMMARY OF THE INVENTION

My invention provides such an improved apparatus and method for recharging batteries in a portable electrical or electronic device, through the use of a wireless battery charger, having an intermediate electrical energy storage device that is charged from a non-power line connected source, and discharged to recharge the battery of a portable device placed into a charge port of the wireless battery charger. The non-power line connected source may be a solar cell for converting light impinging on the solar cell into electrical energy. The non-power line connected source may also be a fuel cell for converting a fuel into electrical energy. The wireless battery charger may also include multiple sources, such as both a solar and a fuel cell. Charging the intermediate electrical energy storage device from the non-power line connected source may take place over an extended period of time having a duration longer than the time required to charge the battery of the portable device.

In one form of my invention, the charge port contains electrical contacts that mate with corresponding electrical contacts of the portable device. In another form of my invention, the wireless battery charger and portable device include transformer elements that allow the battery of the portable device to be re-charged by magnetic induction, without the need for electrical contacts in either the charger port or on the portable device.

The foregoing and other features and advantages of my invention will become further apparent from the following detailed description of exemplary embodiments, read in conjunction with the accompanying drawings. The detailed description and drawings are merely illustrative of my invention rather than limiting, the scope of the invention being defined by the appended claims and equivalents thereof.

BRIEF DESCRIPTION OF THE PRESENTLY PREFERRED EMBODIMENTS

Figure 1:
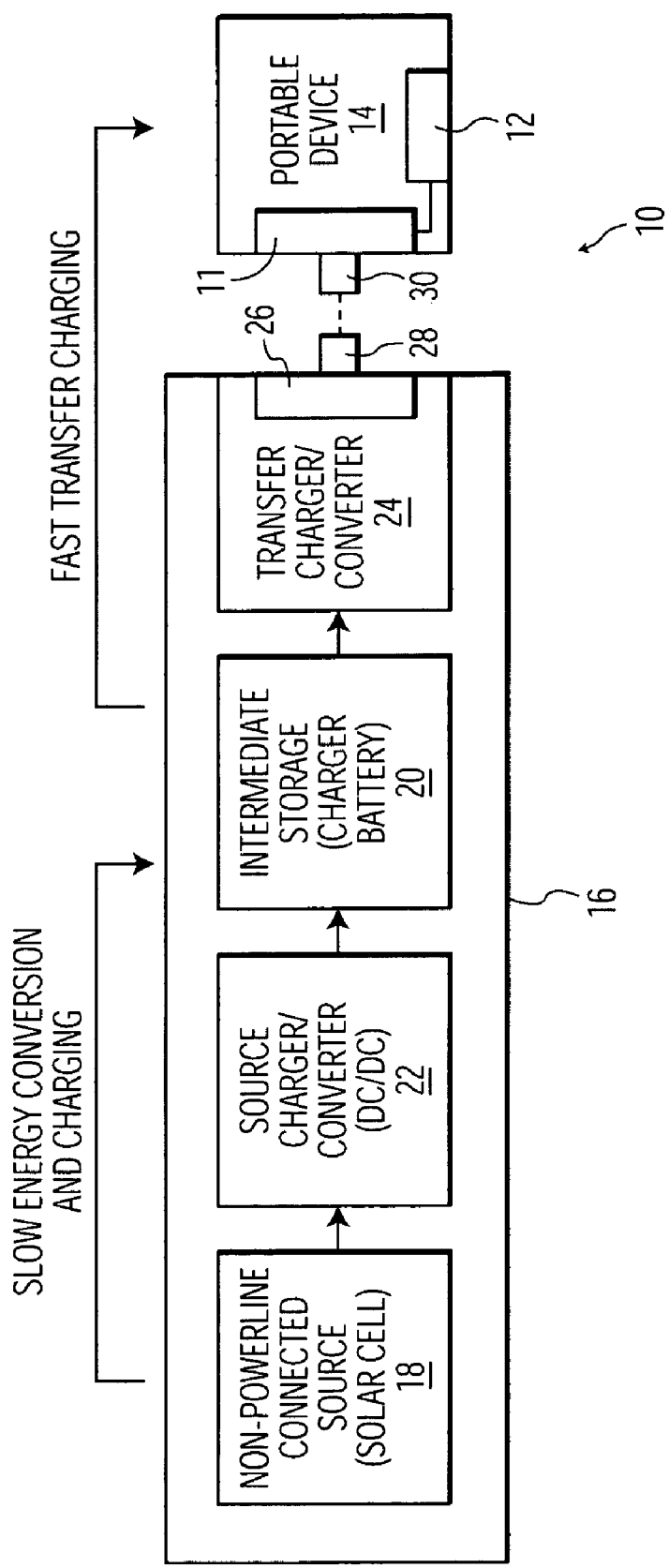
FIG. 1 is a schematic representation of a first exemplary embodiment of an apparatus, according to my invention, for charging a battery in a portable device.

FIG. 1 is a schematic representation of a first exemplary embodiment of an apparatus 10, according to my invention, for charging a battery 12 in a portable device 14. The apparatus 10 includes a wireless charger 16 having a non-power-line-connected source of electrical charge, in the form of a solar cell 18 for converting light energy impinging on the solar cell 18 into an electrical charge, and an intermediate storage device, in the form of a charger battery 20 for storing the electrical charge. The wireless charger 16 also includes a source charger/converter, in the form of a direct-current to direct-current (DC/DC) converter 22, for charging the charger battery 20 with the electrical charge received from the solar cell 18. The wireless charger 16 further includes a transfer charger/converter 24, having a transfer circuit 26 and a charger connector 28 adapted to mate with a mating electrical connector 30 on the portable device 14, for delivering the stored electrical charge from the charger battery 20 to the battery 12 via a charging circuit 11 in the portable device 14.

The solar cell 18 and DC/DC converter 22 convert light impinging on the solar cell 18 into electrical charge, and store electrical charge in the charger battery 20 over an extended period of time that is longer in duration than the time required for delivering the stored electrical charge from the charger battery 20 to the battery 12 of the portable electrical device 14. This approach of storing the electrical charge in the charger battery 20 over an extended period of time, and delivering it over a short period of time, provides considerable advantage in comparison to charging the battery 12 in the portable device 14 directly from the solar cell 18.

It is desirable that the electrical charge stored in the charger battery 20 be transferable to the battery 12 of the portable device 14 in a reasonably short period of time, such as 15 to 30 minutes, so that the device battery 12 can be quickly re-charged to an operating condition, by a solar cell 18 that is small enough in size to fit into the wireless charger 16. Desirable types of non-power-line-connected power sources, such as solar cells and fuel cells are often only capable of producing electrical charge at a limited rate that would require many hours to fully re-charge the battery 12 in the portable device 14, if the non-power-line-connected source were used for directly charging the battery 12 without the capability of storing the electrical charge in an intermediate storage device, such as the charger battery 20.

Without the intermediate storage device 20 of my invention, the solar cell 18 would have to be made much larger in order to produce the electrical charge at a rate high enough for re-charging the battery 12 of the portable device 14 in an acceptable period of time. I contemplate that in many embodiments of my invention, the solar cell 18 should be of sufficient size to re-charge the charger battery 20 over an extended period of time in the range of six to seven hours, under conditions where the solar cell 18 is exposed to partial sunlight.

Figure 2:
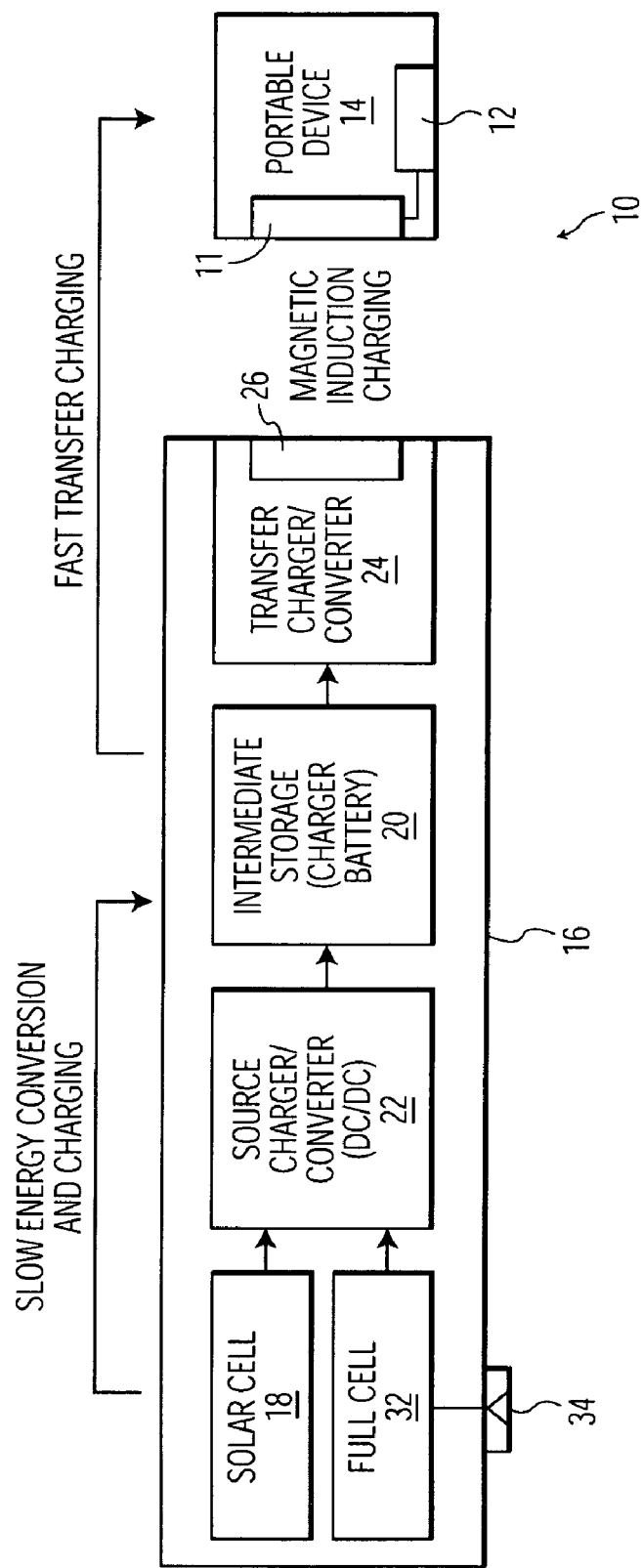
FIG. 2 is a schematic representation of a second exemplary embodiment of an apparatus, according to my invention, for charging a battery in a portable device.

FIG. 2 is a schematic representation of a second exemplary embodiment of an apparatus 10 according to my invention having a wireless charger 16 that includes both a solar cell 18 and a fuel cell 32, as non-power-line-connected sources for generating the electrical charge. The fuel cell may take many forms. The fuel cell 32 may utilize a fuel, such as methanol (wood Alcohol) supplied to a fuel reservoir in the fuel cell via a fuel fill port 34 of the wireless charger 16, and be rechargeable by refilling the fuel reservoir through the fill port 34. In other forms, the fuel cell 32 may be essentially "solid state," and non-rechargeable. Such a solid state fuel cell is constructed of materials that generate electrical energy by consuming a fuel element included in fuel cell when it is constructed. Once the fuel is consumed, the solid state fuel cell is replaced because it is not rechargeable.

The second embodiment 10 also utilizes magnetic induction, rather than electrical connectors, for transferring the charge stored in the charger battery 20 to the portable device battery 12. This is accomplished in the second exemplary embodiment by including a VHF inverter and the primary winding of a transformer in the transfer circuit 26 of the charger 16, for wirelessly transmitting the charge by magnetic induction to a secondary transformer winding and a rectifier in the charging circuit 11 of the portable device 14.

Figure 3:
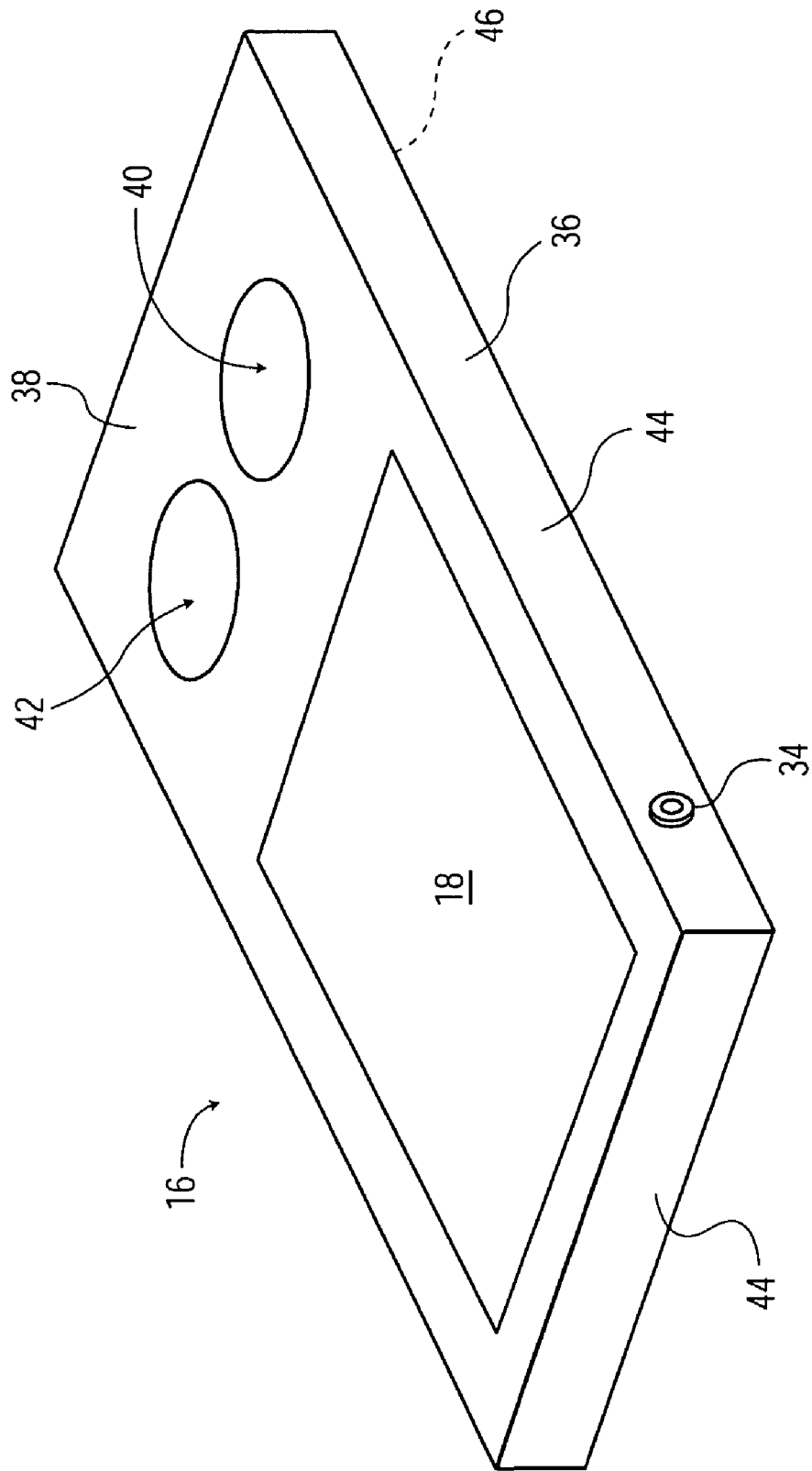
FIG. 3 is a perspective drawing of a wireless charger in the form of a relatively flat pad, according to my invention, incorporating the elements of the second embodiment of my invention as shown in FIG. 2.

I contemplate that a wireless charger 16, according to my invention may be provided in a wide variety of physical embodiments. FIG. 3 shows one exemplary embodiment of a wireless charger 16, having internal configuration similar to the one described above in relation to FIG. 2.

The wireless charger of FIG. 3 is configured in the form of a relatively flat pad 36 that provides a common mounting and encasing for the solar and fuel cells 18, 32, the charger battery 20, the source charger/converter 22, and the transfer charger/converter 24. The top surface 38 of the pad 36 includes an opening that exposed the solar cell 18 to light impinging on the pad 36.

The top surface 38 of the pad 36 also includes a pair of charging ports 40, 42 adapted for receiving a pair of portable devices 14, one in each of the charging ports 40, 42. The charging ports 40, 42 hold the portable devices 14 in an orientation that brings the primary transformer winding of the wireless charger 16 into proximity with the secondary transformer windings in the portable devices 14, so that the batteries 12 in the portable devices 14 can be charged through magnetic induction. The internal surfaces of the charger ports 40, 42 are preferably closed imperforate extensions of the top surface 38, forming an environmentally sealed enclosure that precludes the entry of any liquid or foreign matter into the pad 36.

The fuel fill port 34 is shown extending from one of the side surfaces 44 of the pad 36, but could alternatively be positioned to extend from the top surface 38, the bottom surface 46, or one of the other side surfaces 44 of the pad 36.

I contemplate that a wireless charger 16 according to my invention, in the form of the pad 36 as described above, having solar and fuel cells 18, 32 and transferring charge by magnetic induction, would have a wide variety of uses.

For example, such a pad could be readily carried by a person, or a group of persons, back-packing in a remote area where there is no access to electrical power from power lines or generators. The pad 36 is small and light-weight enough to be carried on the outside of a pack to receive sunlight throughout the day, and used for re-charging batteries in portable electronic devices such as cellular telephones, pagers, or two-way radios when the back-packers stop for the night, or to rest. The sealed construction of the charger ports 40, 42, and use of magnetic induction for transferring the charge allow the pad 36 to be used even in rainy conditions without fear of water entering into and damaging the wireless charger 16 or the portable devices 12, or causing an electrical short in the connection between the wireless charger 16 and the portable devices 12 being charged. When there is insufficient sunlight to fully charge the batteries 12 in the portable devices 14, the fuel cell 32 can be used. Since the fuel cell 32 serves only as a backup to the solar cell 18, only a small amount of fuel for the fuel cell would need to be carried. Fuel cell fuels such as wood alcohol could also be used for the additional purpose of helping to start campfires.

A pad 36 similar in construction to the one described above for use in back-packing would also be well suited for use in a remote construction site for re-charging portable electrical hand tools, or at a maitre 'd station for charging pagers.

I also contemplate that a pad 36, having multiple sealed charging ports 40, 42 as described above, but without the fuel cell, would be well suited to home use for re-charging small portable electrical devices in the bathroom, kitchen, or workshop.

In the bathroom, a wireless charger 16, according to my invention, can be utilized for charging electric toothbrushes or an electric shaver. Electric toothbrushes and shavers are typically only used for a minute or two each day, while the bathroom lights are typically burned for several hours a day as family members use the bathroom. Ambient light impinging upon the solar cell 18, either from sunlight coming through bathroom windows or from electrical lighting in the bathroom for several hours a day while the bathroom is in use, would provide ample energy for charging one or more electric toothbrushes, or electric shavers that are only used for a few minutes a day.

In a kitchen, a wireless charger 16 according to my invention can be utilized for charging portable electrical utensils such as a hand held food mixer, or an electric knife, which are used infrequently for only a few minutes at a time, separated by long periods of non use, during which ambient light impinging on the solar cell 18 can be stored by the charger battery 20. Should the battery 12 of the portable device 16 become discharged during use, it can be recharged from the charge stored in the charger battery 20 far more rapidly that would be possible using the solar cell 18 alone. Because the battery 12 in the portable device 16 can be quickly recharged, it can be made smaller and more lightweight than it would otherwise be if it were required to store enough energy delivered directly from a solar cell, to allow several minutes of operation of the utensil.

A wireless charger 16 according to my invention having sealed charger ports 40, 42 provides additional advantages for use in either a kitchen or a bathroom in that there is no risk or electrical shock, and in that if soapy water or food is spilled onto the pad 36, it can easily be wiped or washed away from the smooth imperforate surface of the sealed charger ports.

Although the forgoing description has utilized certain exemplary embodiments of my invention, many changes and modifications can be made without departing from the spirit and scope of the invention. I wish to expressly point out that the various features and aspects of my invention illustrated and described herein, with reference to the exemplary embodiments, may be utilized in combinations other than those described herein.

For example, it may be desirable in some embodiments of my invention to equip the charger ports 40, 42 of a wireless charger 16 similar to the one depicted in FIGS. 2 and 3, with electrical connectors 28 as illustrated in FIG. 1, rather than using magnetic induction for transferring charge, as illustrated in FIGS. 2 and 3, so that the wireless charger may interface with prior portable devices 14 that do not have the charging circuit 11 of my invention. The wireless charger 16 depicted in FIG. 1 may include multiple non-power-line connected sources, such as the solar cell 18 and fuel cell 32 of FIGS. 2 and 3, or the wireless charger 16 depicted in FIGS. 2 and 3 may include only a single non-power-line connected source.

I also contemplate that a wireless charging apparatus 10 according to my invention may be integrally incorporated into and include many other structures, such as articles of furniture, a rack for holding pagers at a maitre 'd station, a back-back, a briefcase, a purse, carrying cases for tools or electronic devices, or other similar structures. I contemplate that a wireless charger 16 in the form of a pad 36, according to my invention, may be made alternatively be provided in a form that is rigid or flexible, flat or curved, etc., to suit the needs of a particular application of my invention.

The scope of my invention is limited only by the appended claims, and all changes that come within the meaning and range of equivalents are intended to be embraced therein.

I claim:

1. An apparatus for charging a battery in a portable device, the apparatus comprising:
    a non-power-line-connected source of electrical charge;
    an intermediate storage device for storing the electrical charge to serve as a primary source for recharging the battery in the portable device;
    a source charger/converter for charging the intermediate storage device with an electrical charge received from the non-power-line-connected source; and
    a transfer charger/converter for delivering the stored electrical charge from the intermediate storage device to the battery in the portable device, wherein the source charger/converter transfers the electrical charge to the intermediate storage device over an extended period of time that is longer in duration than a period of time required for delivering the stored electrical charge to the battery of the portable device.

2. The apparatus of claim 1 wherein the intermediate storage device includes a battery.

3. The apparatus of claim 1 wherein the source charger/converter includes a direct current to direct current (DC/DC) converter.

4. The apparatus of claim 1 wherein the non-power-line-connected source includes a solar cell for converting light energy into the electrical charge.

5. The apparatus of claim 1 wherein the non-power-line-connected source includes a fuel cell for generating the electrical charge.

6. The apparatus of claim 1 wherein the transfer charger/converter includes an electrical connector adapted to receive and establish an electrical connection with a mating electrical connector on the portable device, for delivering the stored electrical charge to the battery of the portable device.

7. The apparatus of claim 1 wherein the stored electrical charge is delivered to the battery of the portable device without the use of an electrical connection between the intermediate storage device and the portable device.

8. The apparatus of claim 7 wherein the transfer charger/converter includes elements for generating an alternating current from the stored charge, a transformer, and elements for converting alternating current to direct current, for delivering the stored electrical charge from the intermediate storage device to the battery of the portable device by magnetic induction.

9. The apparatus of claim 1 wherein the source charger/converter includes elements for receiving the electrical charge from the source without the use of an electrical connection between the intermediate storage device and the portable device.

10. The apparatus of claim 1 further including both a solar cell and a fuel cell as non-power-line-connected sources of the electrical charge.

11. A method for charging a battery in a portable device, the method comprising:
    charging an intermediate storage device with an electrical charge received from a non-power-line-connected source;
    storing the electrical charge in the intermediate storage device as a primary source for recharging the battery in the portable device; and
    delivering the stored electrical charge from the intermediate storage device to the battery in the portable device, wherein said charging the intermediate storage device with the electrical charge over an extended period of time that is longer in duration than a period of time required for delivering the stored electrical charge to the battery of the portable device.

12. The method of claim 11 wherein the intermediate storage device includes a battery, and the method further comprises performing a DC/DC conversion of the electrical charge.

13. The method of claim 11 wherein the non-power-line-connected source includes a solar cell and the method further comprises converting light energy impinging on the source into the electrical charge.

14. The method of claim 11 wherein the non-power-line-connected source includes a fuel cell and the method further comprises converting fuel in the fuel cell into the electrical charge.

15. The method of claim 11 further including establishing an electrical connection between the intermediate storage device and the portable device, for delivering the stored electrical charge to the battery of the portable device.

16. The method of claim 11 further comprising delivering stored electrical charge to the battery of the portable device without the use of an electrical connection between the intermediate storage device and the portable device.

17. The method of claim 16 further comprising delivering the stored electrical charge from the intermediate storage device to the battery of the portable device by magnetic induction.

18. The method of claim 11 wherein the apparatus further includes both a solar and a fuel cell as non-power-line connected sources of electrical charge and the method includes charging the intermediate storage device with an electrical charge received from at least one of the solar and fuel cell sources.

19. An apparatus for charging a battery in a portable device, the apparatus comprising:

a non-power-line-connected generator of electrical charge, an intermediate storage device for storing an electrical charge, means for charging the intermediate storage device with the electrical charge received from the non-power-line-connected source; and means for delivering the stored electrical charge from the intermediate storage device to the battery in the portable device as a primary source for recharging the battery in the portable device, wherein the non-power-line connected generator of electrical charge, the intermediate storage device, the means for charging the intermediate device, and the means for delivering the stored electrical charge are all provided in a common encasing, and wherein the means for charging transfers the electrical charge to the intermediate storage device over an extended period of time that is longer in duration than a period of time required for delivering the stored electrical charge to the battery of the portable device.

20. The apparatus of claim 19 further comprising means for delivering the stored electrical charge from the intermediate storage device to the battery of the portable device by magnetic induction.

* * * * *